March 4, 1969  R. W. BUSHMEYER  3,430,584
ROTARY COMPRESSOR-TYPE HAY PELLETER
Filed Dec. 28, 1965  Sheet 1 of 5

INVENTOR.
Richard W. Bushmeyer
BY
Dressler, Goldsmith, Clement, Gordon & Todd
ATTORNEYS

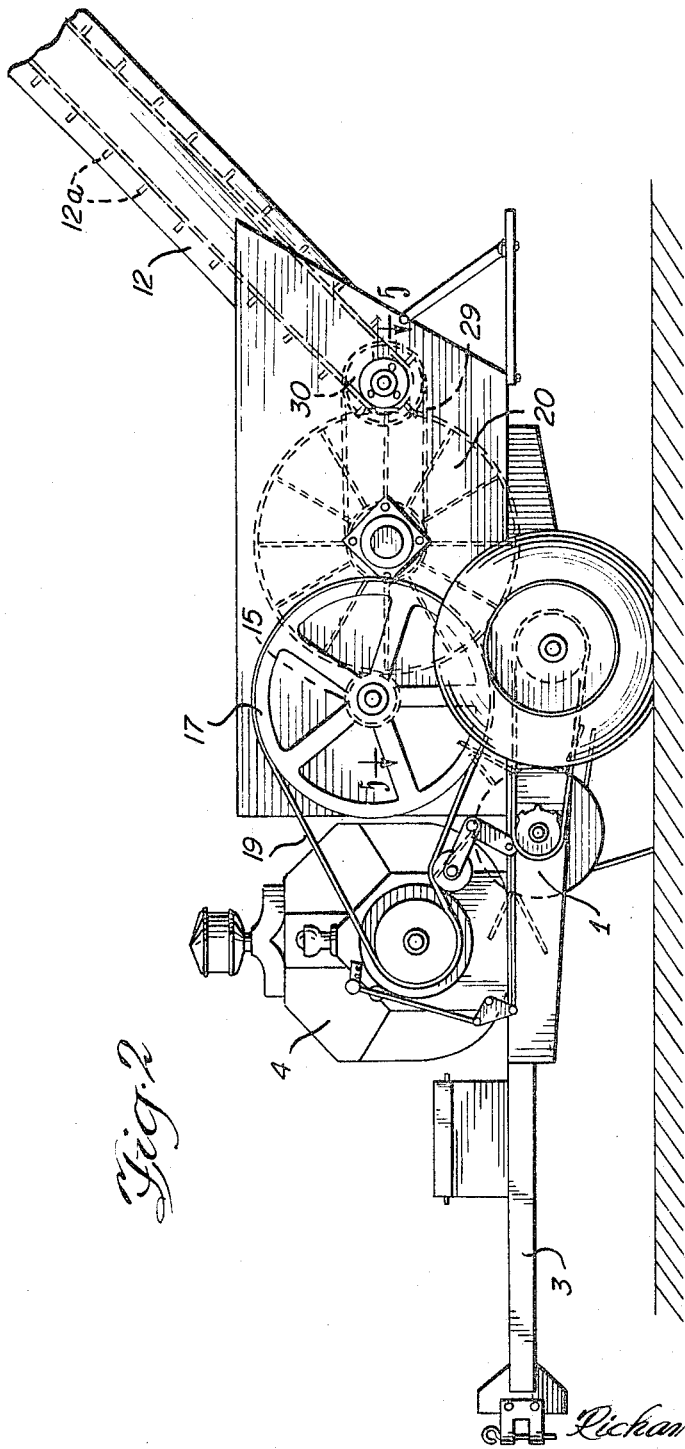

INVENTOR.
Richard W. Bushmeyer
BY
Dressler, Goldsmith, Clement, Gordon & Lott
ATTORNEYS

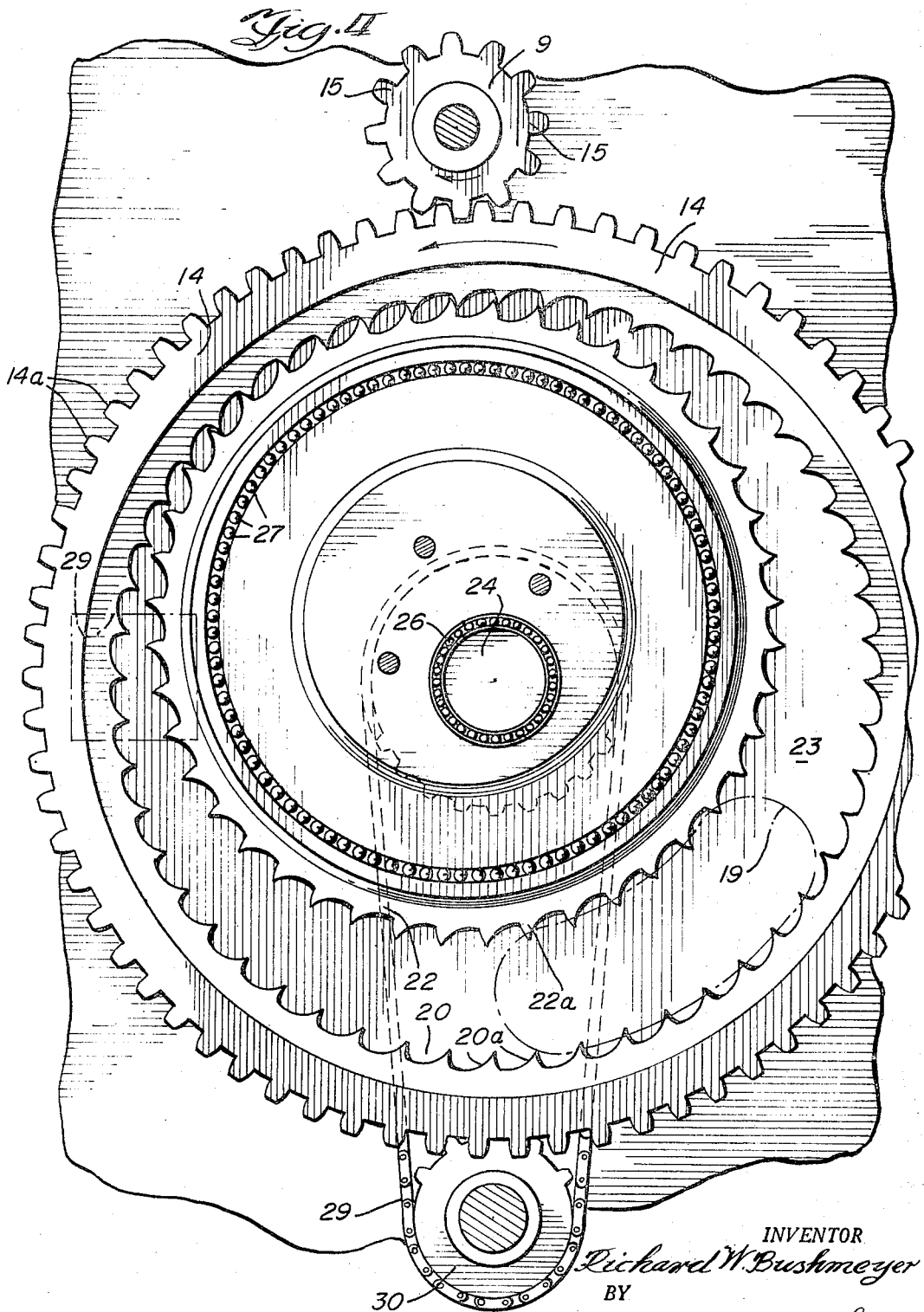

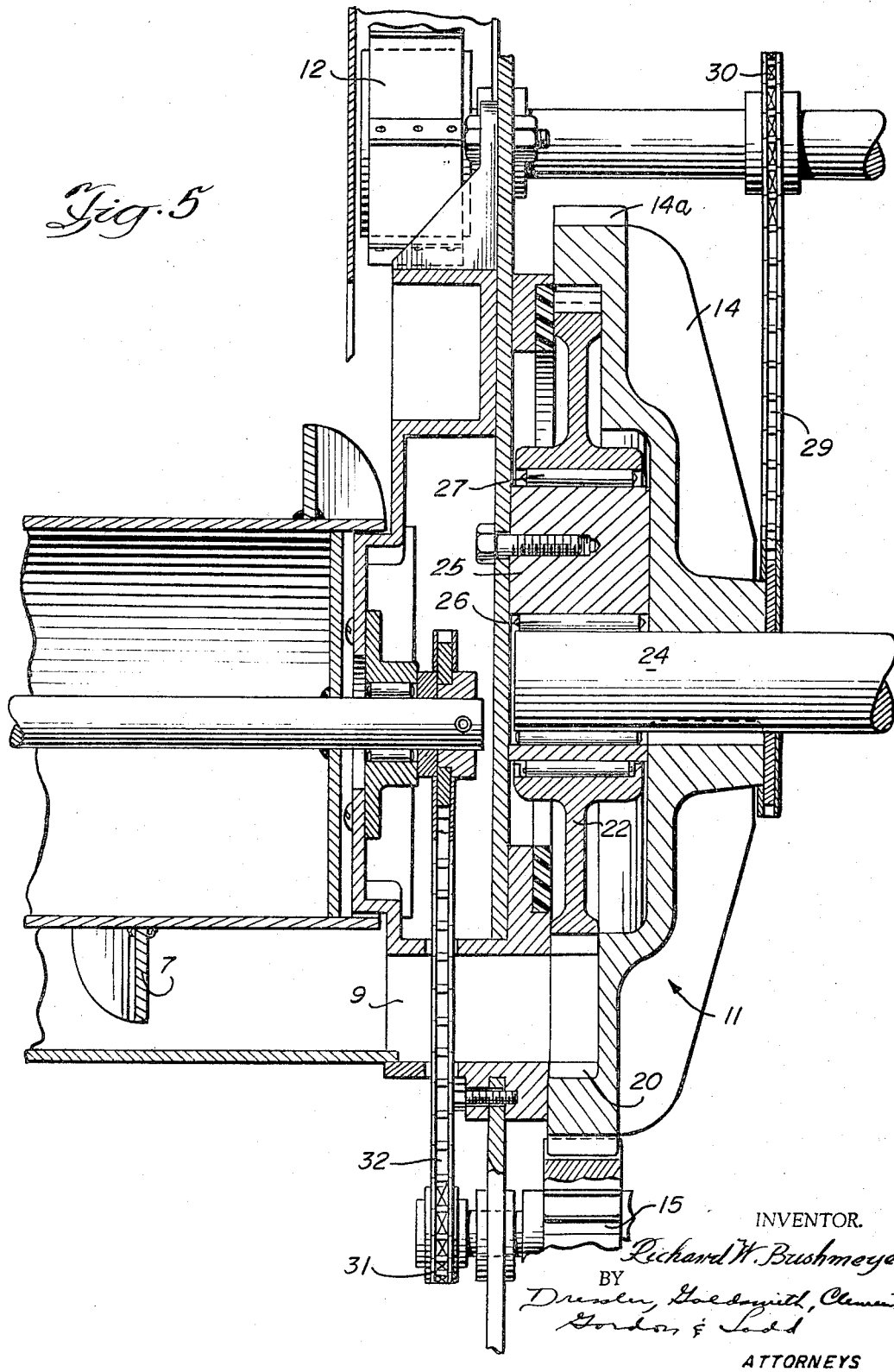

United States Patent Office 3,430,584
Patented Mar. 4, 1969

3,430,584
ROTARY COMPRESSOR-TYPE HAY PELLETER
Richard W. Bushmeyer, Rockford, Ill., assignor to J. I.
Case Company, a corporation of Wisconsin
Filed Dec. 28, 1965, Ser. No. 518,759
U.S. Cl. 107—8                                    2 Claims
Int. Cl. A23n 17/00

ABSTRACT OF THE DISCLOSURE

This invention relates to a hay pelleter which includes a pair of mating eccentrically mounted, rotatably supported gears into which material to be compressed is introduced. The gears are brought into mating engagement and defined between adjacent pairs of mating teeth in an area which decreases in size for compressing the material introduced therein into a pellet. The meshing engagement of the teeth acts to shear off a quantity of material from the main body of material.

---

This invention relates to a hay pelleter, and particularly to one which employs a pair of mating gear members that are positioned to compress crop material therebetween and form same into a pellet.

In hay pelleters currently on the market, the principle most generally employed is that of the extrusion process. This process requires high horsepower and has resulted in a large, somewhat bulky machine. Furthermore, such equipment does not have a very high capacity, which renders it undesirable from the farmer's standpoint.

It can be appreciated that a hay pelleter which, while utilizing low horsepower is capable of producing a substantial quantity of pellets in terms of tons per hour, would be very desirable and readily accepted by farmers. Such a machine, in order to be acceptable, should be relatively simple in operation and capable of use over a wide range of conditions.

In accordance with the present invention, there is provided a field-type hay pelleter of a rotary compressor type, which uses relatively simple mechanical components while forming pellets at a rapid rate. The machine employs a rotary compressor unit consisting of an internal gear and pinion from which every other gear tooth has been omitted. The internal gear also includes an outer gear that is driven and by a freely rotatable inner gear which is eccentrically mounted relative to the inner gear. Crop material is admitted into the space between the inner gear and pinion where they are furthest apart and the inner gear and pinion are moved in a direction in which the gears approach each other. During the action, the crop material disposed therebetween is compressed. This compression continues until the gear teeth opposing each other mesh and form a small chamber containing a compressed mass of material in the shape of an elliptical pellet. During the meshing action, the engaging gear teeth act to shear the pellet being formed from the remaining material to form a separate and distinct pellet. The pellet so formed is then moved toward an ejector cam, which directs the pellet out of the space between the engaging gear teeth and onto an elevator, from where it is collected by a wagon, or the like. The outer gear is driven through a suitable driving mechanism from a prime mover mounted on the unit, which prime mover also serves to power the auger, pickup, and elevator in a manner which forms no part of the present invention.

It will be apparent from the accompanying drawings and the following description that there are many advantages to this device which will become readily apparent.

FIGURE 2 is a rightside view of the pelleter;

FIGURE 4 is a view taken along line 4—4 of FIGURE 1;

FIGURE 5 is a view taken along line 5—5 of FIGURE 2; and

Figure 1:
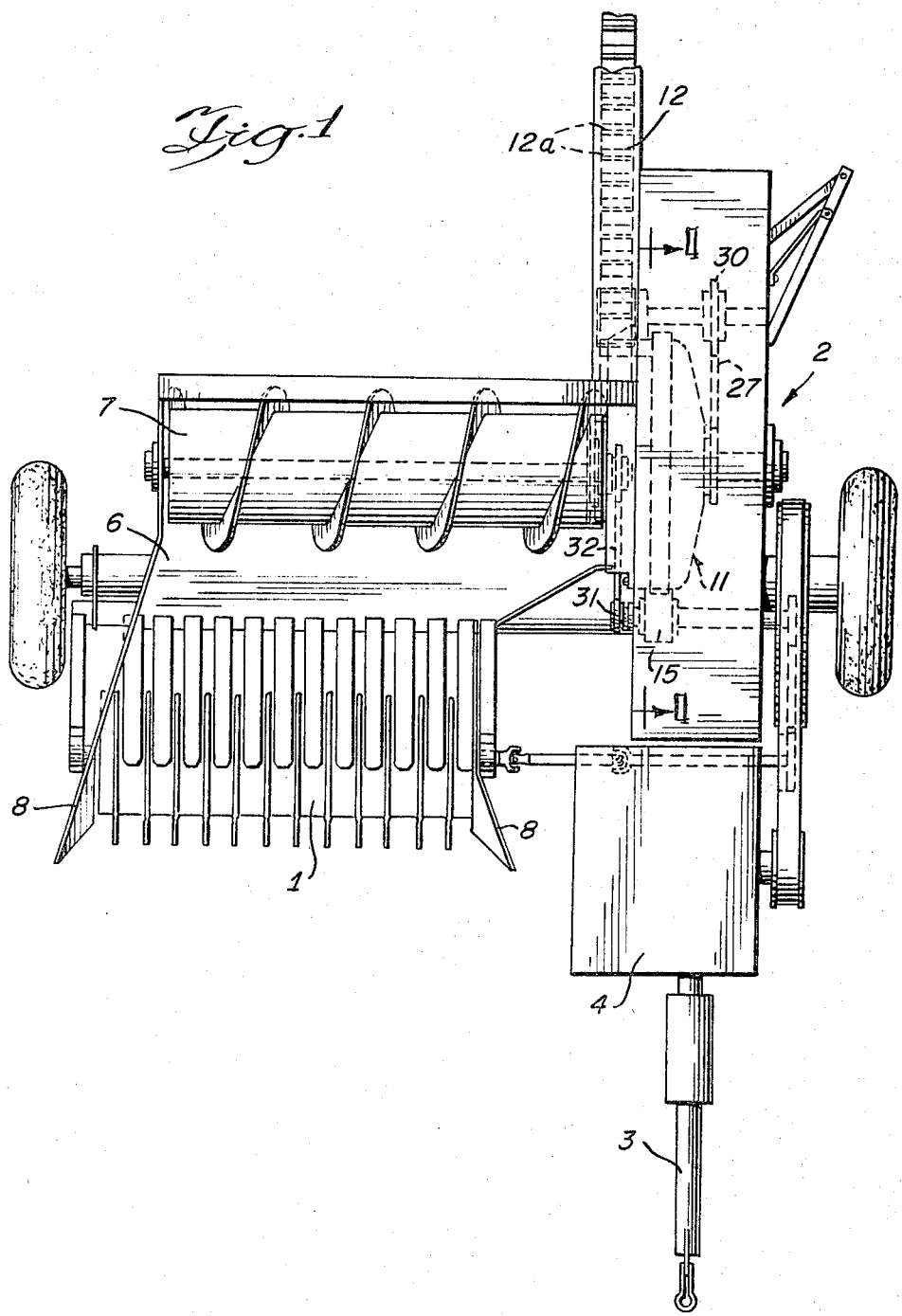
FIGURE 1 is a plan view of a pelleter embodying the present invention.

Referring first to FIGURE 1, there is shown a conventional pickup 1, which picks up the crop from the ground as the pelleter 2 is being towed down a field in which a crop has ben windrowed. The pelleter is designed to be drawn by a tractor (not shown) through a drawbar 3. Power to the pelleter is provided by a separate engine 4 mounted thereon, but, of course, it can be driven through a power take-off from the tractor. The engine drives the pickup through suitable drive mechanisms, and the pickup functions to pick the forage, or other material, and place it on a platform 6 leading into an auger 7. Located on the pickup are wind guards 8 which provide some initial compression for the crop being directed onto the platform. It is to be noted that a flail type harvester could be used in place of the pickup shown, if desired. The auger 7 is driven from the engine 4 through a mechanism to be disclosed hereinafter and acts to move the material directed thereto into the rotary compressor unit 11 forming the heart of the instant invention through an inlet opening 9 (see FIGURE 5). A second stage of compression takes place due to the action of the auger and results in a substantial increase in density of the material. The pressure exerted on the material by the auger is perpendicular to the pressure exerted by the roller compressor in the final stage of compression and tends to result in a more durable pellet which is less susceptible to damage in handling. After the material is formed into a pellet, it is moved onto an elevator 12 which can direct the pellets into a trailing wagon.

The rotary compressor unit is shown in detail in FIGURES 4 and 5. As therein illustrated, it consists of a large outer gear 14 which is driven by a pinion 15 that is in turn powered by the prime mover 4 through the fly wheel 17 that is driven by belt 18 (see FIGURE 2). The teeth 15a of pinion 15 contact teeth 14a cut into the outer circumference of gear 14. The outer gear 14 has cut into an inner portion thereof an internal gear 20 that has spaced teeth 20a providing material receiving cavities therebetween. In relation to external teeth on gear 14, the internal teeth 20a are positioned substantially opposite alternate external teeth with each material receiving cavity provided in the gear opposite an alternate remaining external tooth 22a on pinion 22 located within gear 20 to form a pellet therebetween. However, the teeth 20a and 22a of the internal gear and pinion, respectively, are of such design so that there are ample teeth in contact for strength and uniform motion. The teeth 20a and 22a are formed on one side with a driving surface which mates to permit the gear 14 to drive gear 22 and on its opposite side with a compressing surface which acts to interact with a similar compressing surface on an adjacent tooth to form the compression chamber within which the pellet is formed. All the power is received by the pinion through these gear teeth.

In order to provide for compression of the material into pellets, the pinion 22 is eccentrically mounted relative to the internal gear 20 so that the teeth of the large gear 20 is located at its maximum distance from opposing teeth 22a in the area adjacent the inlet opening 9 into which the material is fed by the auger 7. As clearly shown in FIGURE 4, the space between teeth 20a and 22a decreases as it is measured in a counterclockwise direction. It is this reduction in space which brings about the compression of the crop material and the subsequent formation of a pellet. To accomplish the aforementioned structurally, the gear 20 is keyed to a shaft 24 that is free to rotate relative to a fixed support 25 through a bearing 26. The pinion 22 is eccentrically mounted relative to gear 20 and is also free to rotate relative to support 25 through a bearing 27. As shown in FIGURE 4, the gear 20 rotates in a counterclockwise direction with the result that the space 23 between the teeth of the gear 20 and pinion 22 steadily decreases with a resultant increase in the density of the material disposed therebetween. During this action, the pinion 22 is driven through the action of the interengagement of teeth 22a with the gear teeth 20a. In order to form a separate and distinct pellet, the teeth of the gear 20 and pinion 22 come into shearing contact and form separate chambers in which a pellet is formed. The shearing action and the interengaging teeth define a slightly elliptical pellet when the teeth first engage, and the pellet continues to be reduced in size with an attendant increase in density thereof during the period that the teeth are in engagement, which in the illustrated embodiment is approximately 45°.

The action of the internal gear and pinion on the material being compressed is that of a long, gradually tapered wedge, and hence there is no tendency for the material to buckle or fail to feed and hence the flow of material is smooth and uniform. In one embodiment, there are provided 52 pellet cavities in the internal gear 20 and 44 in the pinion 22. For this reason, the speed may be kept very low and still great capacity is obtained. Low speed plus inherent balance results in freedom from vibration. Furthermore, because the crop material is maintained under pressure for a relatively long period of time, the peak pressure required for forming a stable pellet is reduced.

Figure 6:
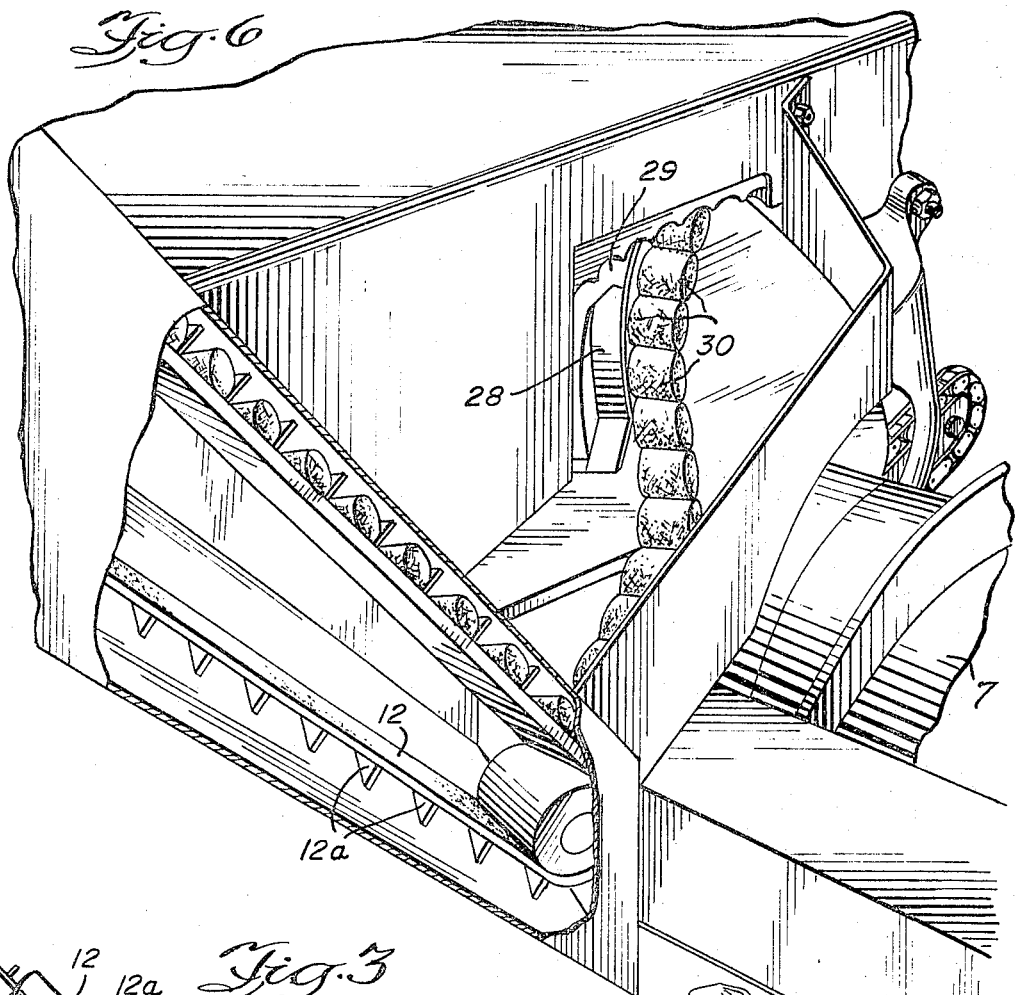
FIGURE 6 is a perspective view showing the pellets leaving the forming chamber.
Figure 3:
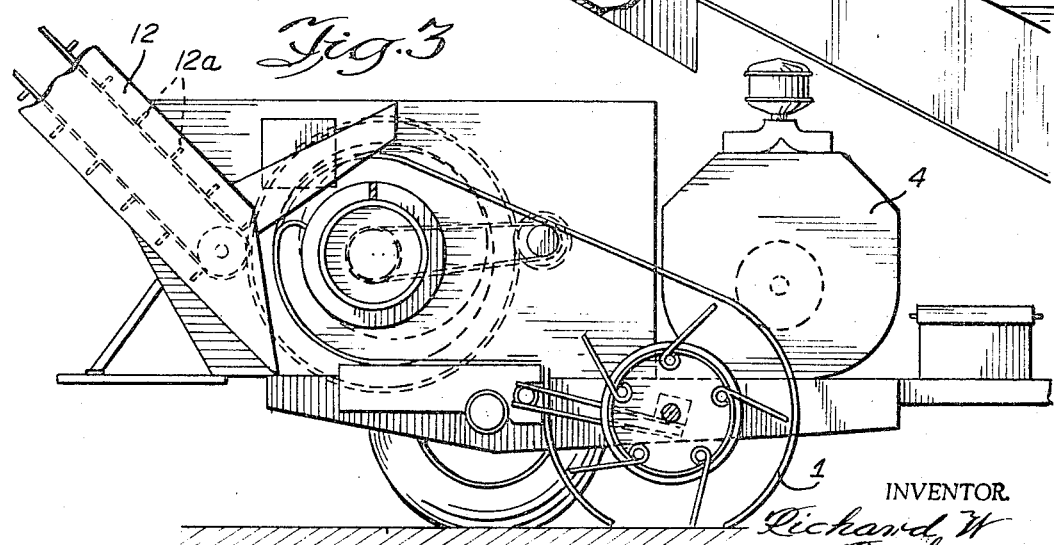
FIGURE 3 is a leftside view of the pelleter shown in a smaller scale.

As the pinion and gear moves apart, as shown on the lefthand side of FIGURE 4, the pellets are brought into contact with an ejector cam 28 located in an outlet opening 29 (see FIG. 4) which directs the pellets 30 out of the cavities formed between the gear teeth and leads it onto the elevator 12, as shown in FIGURE 6. The curved cam is located beyond the point that the pellet cavities open and thus virtually no energy is required for ejecting the pellet. The elevator has cleats 12a receiving and supporting the pellets during its travel upwardly, after which it is dropped onto a trailing wagon. Pellets formed in this manner require only 2 to 5 horsepower hours per ton as compared to 20 to 30 horsepower hours per ton by the extrusion process.

It remains to note that the elevator 12 is driven off of the gear 20 through chain 29 and sprocket 30, and the auger is driven off of the pinion 15 through sprocket 31 and chain 32.

While a particular embodiment has been shown and described, other equivalent arrangements could be used if desired. For example, a pair of beveled gears could be substituted for the internal gear and associated pinion. The gears must be of ample diameter and the pellet cavities formed in a manner similar to those with the internal type gear and the gears would have to be proportioned so that a satisfactory contact ratio would be obtained. Also, while in the illustrated embodiment the outside gear is driven, the invention could be practiced by driving the inside gear and not the outside gear.

What is claimed is:
1. A pelleter for crops including a compressor unit comprising a pair of eccentrically mounted rotatably supported gears having teeth that are in meshing engagement during a portion of their travel during which they form cavities therebetween and are spaced apart at another region to define a chamber decreasing in area leading to where the cavities are formed, said mating teeth defining a driving surface on one side and a hay compressing surface on the other side thereof, means for driving one of said gears, said compressor unit defining in inlet opening leading into said chamber, whereby when the gears are driven the adjacent pairs of cooperating gear teeth define a continuously reduced area for compressing the material introduced thereto to form a pellet.

2. A pelleter for crops including a compressor unit comprising a pair of eccentrically mounted rotatably supported gears having teeth that are in meshing engagement during a portion of their travel during which they form cavities therebetween and are spaced apart at another region to define a chamber decreasing in area leading to where the cavities are formed, said mating teeth defining a driving surface on one side and a hay compressing surface on the other side thereof, the driving surfaces of said teeth being in shearing engagement, means for driving one of said gears, said compressor unit defining an inlet opening leading into said chamber, whereby when the gears are driven the adjacent pairs of cooperating gear teeth define a continuously reduced area for compressing the material introduced thereto to form a pellet, and means for ejecting the pellet formed in the cavities.

References Cited

UNITED STATES PATENTS

| 1,931,759 | 10/1933 | Hasing | 25—21 |
| 2,865,311 | 12/1958 | Thurlings | 107—8 |
| 3,015,199 | 1/1962 | McKeon et al. | 56—1 |

FOREIGN PATENTS

| 678,354 | 9/1952 | Great Britain. |
| 703,582 | 2/1954 | Great Britain. |

HUGH R. CHAMBLEE, *Primary Examiner.*

U.S. Cl. X.R.

56—1